United States Patent

[11] 3,607,210

| [72] | Inventor | Magnus L. Froberg<br>Newark, Ohio |
|---|---|---|
| [21] | Appl. No. | 707,818 |
| [22] | Filed | Feb. 23, 1968 |
| [45] | Patented | Sept. 21, 9171 |
| [73] | Assignee | Owens-Corning Fiberglas Corporation |

[54] APPARATUS FOR CONVEYING GLASS IN A FOREHEARTH
12 Claims, 3 Drawing Figs.

[52] U.S. Cl............................................................ 65/346,
 65/2, 65/11, 65/135, 65/347, 65/356, 65/374
[51] Int. Cl........................................................ C03b 5/16
[50] Field of Search.......................................... 65/347,
 335, 26, 25 A, 374, 346, 2, 11, 11 W, 356, 135;
 117/124 A, 124 B, 123 A, 123 B; 13/6

[56] References Cited
UNITED STATES PATENTS

| 1,833,712 | 11/1931 | Hawke | 65/26 |
| 1,999,762 | 4/1935 | Howard | 65/335 |
| 3,205,055 | 9/1965 | Laurent | 65/374 |
| 3,245,830 | 4/1966 | Flexon | 65/346 |
| 1,953,023 | 3/1934 | Mulholland | 65/135 |
| 3,318,694 | 5/1967 | Heitmann | 65/374 |

*Primary Examiner*—S. Leon Bashore
*Assistant Examiner*—Robert Lindsay
*Attorneys*—Staelin and Overman and Paul F. Stutz ABSTRACT: A forehearth construction which comprises a channellike lower segment formed of refractory for conveying molten glass, an upper segment defining a generally coextensive, generally closed chamber for confinement and circulation of burning gases to control and regulate the temperature of said molten glass in said lower segment and a barrier or shield member located between said segments, said shield being a heat conductor resistant to deformation in the temperature range 1,800° F. to 2,400° F. and resistant to refractory attacking volatiles emanating from said glass.

PATENTED SEP 21 1971 3,607,210

INVENTOR.
MAGNUS L. FROBERG
BY
Stachin & Cureman
ATTORNEY

APPARATUS FOR CONVEYING GLASS IN A FOREHEARTH

As is well known in the art, glass is conveyed usually in a plurality of longitudinal forehearths extending radially from a central glass melting furnace with the far or remote end thereof terminating in a discharge opening where the molten glass is withdrawn for forming into its ultimate shape, whether it be through an intermediate bushing to a plurality of filaments or to a mold or to facilities for forming flat glass. Glass melting furnaces may feature three forehearths extending radially from one side and angularly disposed at anywhere from 30° to 60° with respect to each other. Most frequently, two forehearths or modifications thereof have been used in the glass fiber industry.

The forehearth must be constructed in such a manner and of such materials as will maintain the glass within fairly precise temperature limits. The reason for this is that the thermal history of the glass in proceeding from the glass melting furnace to the discharge opening is very important and influential upon the quality, e.g., appearance and physical properties of the ultimate glass product. Too wide a variance in temperature in proceeding along the forehearth can have detrimental effects upon the quality, both as to physical properties and appearance, of the ultimate product. As a consequence, it is conventional to form the forehearth of relatively expensive refractory materials which are designed to confine the heat therewithin and to resist the corrosive character as well as the erosive nature of the molten glass as it proceeds axially along the forehearth. The usual forehearth construction will feature a lower channellike segment which is adapted to contact the molten glass and, situated above it coextensive with the channel, a crown portion including burner ports in which are situated burners adapted to discharge flame in the upper segment; the heat providing a blanket over the upper surface of the molten glass.

In the operation of forehearths, it is frequently necessary to close down the forehearth for replacement of the upper segment of refractory due to the attack of the refractory by certain volatiles given off by the molten glass as it proceeds therethrough. The volatiles given off by the molten glass include, for example, lead, boron, fluorine, alkalis and the like, alone or in the form of compounds and mixtures thereof. It has also been observed that the molten glass emanating from the discharge opening will contain parts of the refractory superstructure forming the upper portion of the forehearth due to the fact that the gaseous volatiles have penetrated into the refractory emanating rapidly from the initial penetration (much as decay in a tooth) leading to "spalling off" of chunks of the refractory. The presence of chunks of refractory in the molten glass is undesirable since it can interfere with the discharge of the glass and, as well, it alters the composition of the glass, leading to defects.

Previous attempts at overcoming these problems have taken the form of utilizing an extremely high grade, expensive refractory material in forming the upper crown region of the forehearth with the thought that such refractory would be less likely to be attacked by the volatiles which emanate from the molten glass. One such refractory which has been used is marketed under the name "Zircon," a slip cast or pressed zirconium silicate, reported to have the formula $ZrSiO_4$. While the employment of "Zircon" refractory has been of some help in this situation, it has not entirely solved the problem since deterioration ultimately occurs and at the same time adding tremendously to the cost of forehearth construction.

With the foregoing introduction, it is a general object of the present invention to provide a forehearth construction which is not beset with the above-enumerated problems.

It is another object of the present invention to provide a particular forehearth construction which, by reason of the novel features of the present invention, is long lived and yet is quite economical compared to previous solutions.

It is still another object of the present invention to provide a method of forehearth operation which substantially reduces the evaporation of volatiles from said molten glass surface by shielding the surface of the glass from the burning gases.

It is a particular object of the present invention to provide a forehearth construction which embodies a barrier member situated as to confine the volatiles to a region in closely spaced relationship with the molten glass itself and preventing contact of volatiles with the upper crown region of the forehearth.

The foregoing, as well as other objects of the present invention, will become apparent to those skilled in the art from the following detailed description taken in conjunction with the annexed single sheet of drawings on which there are presented several views inclusive of several embodiments of the forehearth construction of the present invention.

IN THE DRAWINGS

In its simplest embodiment, the present invention envisions a forehearth construction including a lower refractory channel member for conveying molten glass axially along the forehearth and an upper crown arrangement coextensive with the channel below and forming an essentially closed chamber for burning gases; said upper arrangement including means for issuing burning flames across the forehearth and, located between the upper and lower members, a barrier or shield member which is a relatively good conductor of heat, is resistant to deformation in the temperature range 1,800° F. to 2,400° F. and is resistant to volatiles including lead, alkali, boron and fluorine, alone or in the form of compounds and mixtures thereof.

Figure 1:
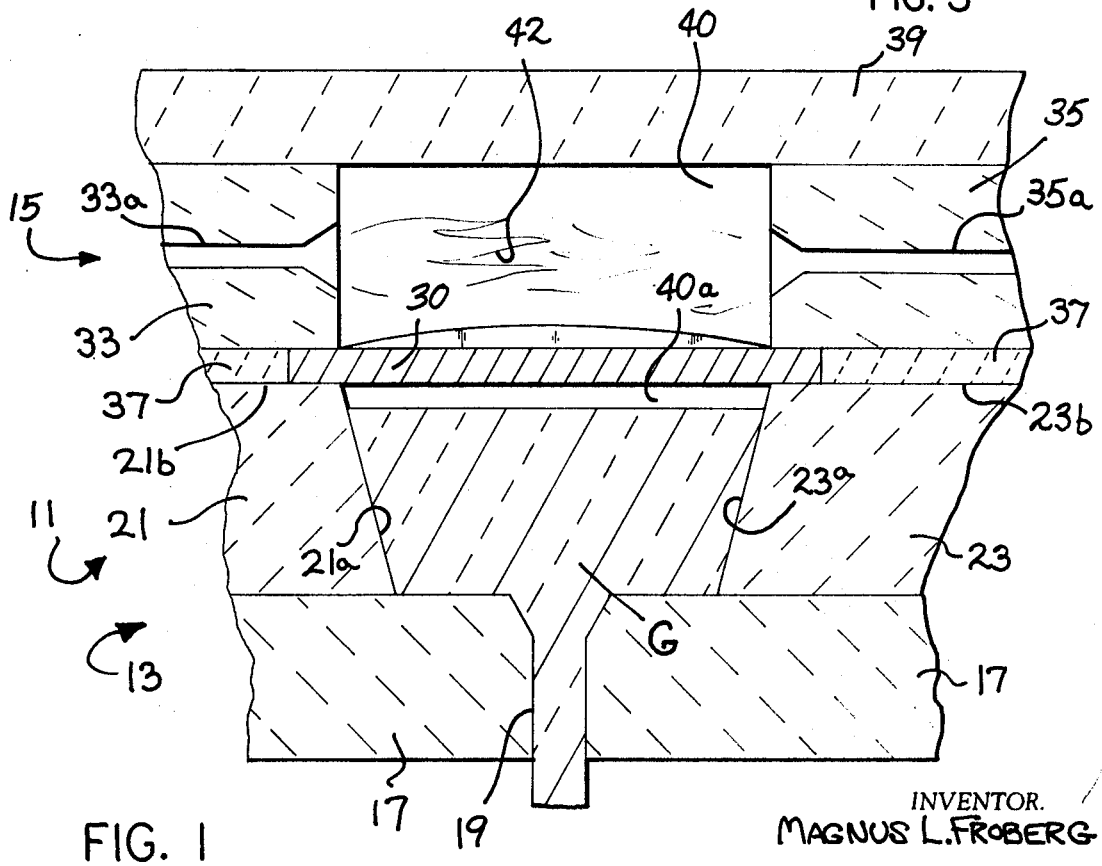
FIG. 1 is a vertical section view of a forehearth construction incorporating features of the present invention.

Referring now more specifically to the drawings, there is disclosed in FIG. 1 a forehearth construction 11 composed of a lower segment, generally designated 13, and an upper segment, generally designated 15. The lower segment is composed of a bottom wall 17 formed of slip cast "Zircon" or of fusion cast alumina-zirconia, a refractory marketed by Corhart Ref. Co. of Louisville, Ky., or Harbison Carborundum Corp. of Falconer, N.Y. or Walsh Ref. Corp. of St. Louis, Mo., including therein a discharge opening 19. The latter may lend to a bushing from which are drawn a plurality of filaments or to a forming station for glass containers or a forming station for sheet glass. Situated on top of the bottom wall are blocks 21 and 23 in spaced-apart relationship and which have facing surfaces, respectively 21a and 23a; said surfaces extending upwardly in diverging relationship with the opposed face and terminating respectively in horizontal top edges 21b and 23b. The bottom wall 17 and the sidewalls 21 and 23 define the channel for the molten glass G; the level extending to a depth just short of said upper edges 21b and 23b of the respective sidewall blocks 21 and 23. In accordance with the invention, a plate 30 extends across the channel space defined by the spaced blocks 21 and 23 and rests on the upper edges 21b and 23b, respectively. Refractory blocks 33 and 35 are situated respectively above the refractory blocks 21 and 23; the lower edges of the blocks 33 and 35 resting on the marginal edge of the plate member 30 and filler refractory members 37. A slab of refractory 39 forms the roof portion of the upper segment 15 and is disposed horizontally, resting on the blocks 33 and 35 in spaced-apart relationship to define the interior upper compartment 40. The blocks 33 and 35 include burner ports 33a and 35a, respectively; the burner ports serving as a passageway for burning gases 42 which circulate through the chamber 40. The arrangement as described, including the sidewall blocks 21 and 23, plate member 30 and the level of the molten glass, define a small chamber 40a above the molten glass level and beneath the plate member 30.

Figure 2:
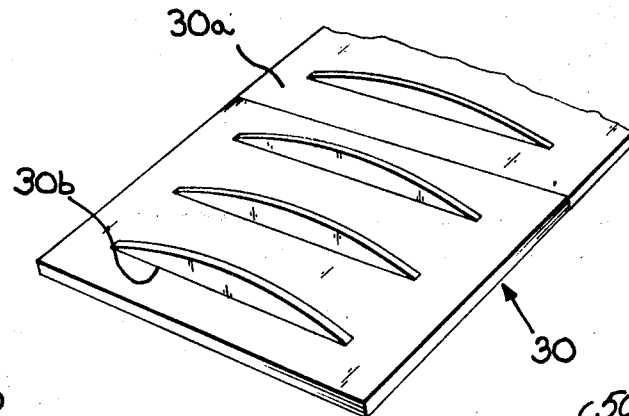
FIG. 2 is a three-quarter perspective view of one component of the modified forehearth construction of the present invention.

The forehearth extends for some 20 to 30 feet from the furnace to the discharge opening and, accordingly, a plurality of plates, such as the plates 30 and 30a, will be situated in edge abutting relationship as illustrated in FIG. 2. The plate member 30 in the embodiment shown measures about 16 inches in the direction of the ribs 30b and about 1 foot in the direction normal thereto. Accordingly, in a 30-foot-long forehearth, about 30 plate members will be employed in edge abutting relationship to form the barrier or shield separating the glass containing the lower part of the forehearth from the upper burner gas compartment 40.

The plate member 30 is desirably formed of a nickel-chrome alloy formulated to be resistant to deformation in the range of temperature encountered in the forehearth and generally in the range of 1,800° F. to 2,400° F. The reinforcing ribs 30b in the embodiment as illustrated are spaced about 4 inches apart and lend strength to the plate member as to make them less susceptible to sagging at the temperature range noted. The nickel-chrome alloy in order to best perform its role at the temperatures encountered in the upper end of said range should contain only a small amount of iron and a significant proportion of tungsten and/or molybdenum; most preferably, tungsten.

In accordance with the present invention, the refractory blocks of which the upper segment 15 of the forehearth is composed can be formed of relatively low grade and quite inexpensive refractory material or relatively inexpensive firebrick material. Recognizing that firebrick costs approximately 6 dollars a cubic foot, whereas "Zircon" costs in the neighborhood of 45 dollars a cubic foot, it can be appreciated that the savings in material are considerable; the cost of firebrick amounting to about 12 percent to 14 percent of the cost of "Zircon." Added to this are savings in labor encountered in rebuilding the forehearth and increased profit in increased productivity.

In the absence of the plate member 30, volatiles emanating from the upper surface of the molten glass are free to circulate throughout the compartment 40 including 40a, being heated and directed vigorously by the burning and swirling gases against the inner surfaces of the structural members 33, 35 and 39, becoming deposited thereon and even driven interiorly of the surface, both by the turbulent conditions therewithin and the usual pressure of approximately 0.02 inches of water, leading to attack of the refractory and ultimately to breaking off of chunks and pieces which drop into the molten glass. With the forehearth construction in accordance with the present invention, the volatile substances given off are confined to the chamber 40a (see FIG. 1). Actual observation of a forehearth construction in accordance with FIG. 1 reveals that after about 12 hours in operation, the underside of the plate member 30 has formed thereon, presumably by a condensation phenomena, a layer of sodium borate. Extended operation reveals that the thickness of the glaze builds up to about one eighth inch and no thicker since the condensate which forms on the previously formed glaze drops off as soon as sufficient thereof collects to form a droplet.

Figure 3:
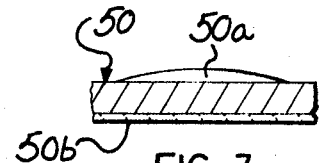
FIG. 3 is a sectional view of a modified form of the member shown in FIG. 2.

In FIG. 3, there is disclosed a barrier plate 50 formed of a metallic carbide, such as silicon carbide which is resistant to deformation at the temperature in the neighborhood of 2,000° F. to 2,400° F., either by reason of the composition thereof or the composition in combination with the strengthening ribs 50a. In accordance with this alternative embodiment of the present invention, the member 50 bears on its under surface a layer 50b of "Zircon" adhered by a suitable adhesive in the nature of a silicate material having the capability of adhering to the carbide and also the refractory. The layer of "Zircon" on the under surface provides the resistance to the corrosive attack of the deleterious volatiles, while the carbide provides the high heat transfer necessary in order that the molten glass will be maintained at the sufficiently high temperature by the atmosphere provided by the burning gases in the upper regions of the forehearth identified as the chamber 40.

The plate 30 in order to have the desired optimum combination of properties desired, namely, high melting point lending resistance to formation at elevated temperature plus efficient heat transfer plus resistance to the corrosive volatiles noted hereinabove, is formed of a tungsten strengthened nickel-chrome alloy. An alloy which has proven to be eminently suitable in a commercial forehearth yields the compositional analysis given in table 1 below.

TABLE 1

| | |
|---|---|
| Silicon | 0.23 |
| Nickel | 50.5 |
| Tungsten | 16.3 |
| Chromium | 32.5 |
| Iron | 0.22 |
| Manganese | 0.19 |
| Carbon | 0.03 |
| Sulfur | 0.01 |
| | 99.98 |

Such a product is marketed by the Blaw Knox Company of Pittsburgh, Pa., under the trade name "MoRe–A2."

A collateral advantage accruing through the employment of the furnace construction in accordance with the present invention resides in the fact that the provision for the extremely small chamber 40a immediately above the molten glass promotes the return of the volatiles to the molten glass whereby there is a closer correlation between the compositional analysis of the ultimate glass desired and the appropriate batch charge composition necessary to achieve the desired glass. At the same time, the shield precludes contact of the swirling and turbulent burning gases with the surface of molten glass. As a consequence, the evaporation rate of said volatiles is reduced, thereby further enhancing the correlation effect maintained just previously.

Although the employment of forehearths for conveying molten glass to a forming position or discharge position somewhat remote from the extremely elevated temperatures of the batch melting furnace has been known for many years, it is believed that the construction in accordance with the features enumerated hereinabove represents the first suggestion and successful utilization of a barrier or shield for the purpose of protecting the upper or crown regions of a forehearth from the deleterious volatiles given off by molten glass, particularly lead, alkali, boron and fluorine.

Modifications may be resorted to without departing from the spirit and scope of the present invention as defined in the appended claims.

I claim:

1. A forehearth for conveying molten glass from a melting region to an outlet region, said forehearth comprising, in combination:
    a linear channel formed of a high grade refractory, said channel extending from said melting region to means defining a discharge opening proximate said outlet region, said channel including a bottom wall and opposed marginal upstanding sidewalls having a height sufficient to exceed the normal level of glass in said channel and thereby contain same as said glass moves therein,
    a crown structure formed of relatively low grade refractory mounted over and generally coextensive with said lower channel, said crown structure including passageways for introducing burning gases into said crown structure, and
    a planar shield spanning said channel walls and located beneath said crown structure and passageways and above said channel to thereby shield said crown structure from said glass in said channel and to shield said glass from contact by said burning gases, said planar shield being heat conductive, resistant to temperature deformation in the range 1,800° F. to 2,400° F. and resistant to volatiles emanating from molten glass moving in said channel, said volatiles including such as boron, alkali, lead, fluorine, compounds and mixtures thereof.

2. a forehearth as claimed in claim 1, wherein said shield is formed of a nickel-chrome alloy.

3. A forehearth as claimed in claim 2, wherein said alloy includes a proportion of tungsten.

4. A forehearth as claimed in claim 3, wherein said alloy has the compositional analysis:

| | | |
|---|---|---|
| | Silicon | 0.23 |
| | Nickel | 50.5 |
| | Tungsten | 16.3 |
| | Chromium | 32.5 |
| | Iron | 0.22 |
| | Manganese | 0.19 |
| | Carbon | 0.03 |
| | Sulfur | 0.01 |
| | | 99.98 |

5. The forehearth as claimed in claim 1, wherein said shield member has formed on its upper surface a plurality of spaced ribs.

6. The forehearth as claimed in claim 5, wherein said ribs are elongate and extend incompletely of the lateral dimension of said shield.

7. The forehearth as claimed in claim 6, wherein said ribs as viewed in longitudinal section protrude upwardly in convex configuration from the upper surface of said shield.

8. The forehearth as claimed in claim 7, wherein the rib height and width are each about equal to the thickness of said planar shield.

9. The forehearth as claimed in claim 5, wherein said shield is constructed and arranged such that the ribs are substantially coextensive with the width of the forehearth channel.

10. The forehearth as claimed in claim 2, wherein said shield member has formed on its upper surface a plurality of spaced ribs.

11. The forehearth as claimed in claim 10, wherein said ribs are elongate and extend incompletely of the lateral dimension of said shield.

12. The forehearth as claimed in claim 1, wherein said shield is formed of a metallic carbide plate bearing a continuous layer of $ZrSiO_4$ on its underside.